United States Patent [19]

Moreland et al.

[11] Patent Number: 5,790,598
[45] Date of Patent: Aug. 4, 1998

[54] BLOCK DECISION FEEDBACK EQUALIZER

[75] Inventors: Kenneth W. Moreland, Munster; Mark B. Jorgenson; Stewart N. Crozier, both of Kanata, all of Canada

[73] Assignee: Her Majesty the Queen in Right of Canada, Ottawa, Canada

[21] Appl. No.: 609,250

[22] Filed: Mar. 1, 1996

[51] Int. Cl.$^6$ .................................................. H03H 7/30
[52] U.S. Cl. ........................ 345/233; 375/232; 364/724.2
[58] Field of Search ............................ 375/232, 233, 375/340; 364/724.2; 333/18, 28 R

[56] References Cited

U.S. PATENT DOCUMENTS

| | | | |
|---|---|---|---|
| 4,365,338 | 12/1982 | McRae et al. | 375/12 |
| 4,730,343 | 3/1988 | Kanemasa et al. | 375/233 |
| 5,293,401 | 3/1994 | Serfaty | 375/13 |
| 5,414,734 | 5/1995 | Marchetto et al. | 375/267 |
| 5,436,929 | 7/1995 | Kawas Kaleh | 375/233 |
| 5,465,276 | 11/1995 | Larsson et al. | 375/346 |

OTHER PUBLICATIONS

S. Crozier et al. "Short Block Equalization Techniques Employing Channel Estimation For Fading Time Dispersive Channel" 39 IEEE Vehicular Technology Conference, pp. 142–146, Mar. 5, 1989.

R. Ramesh "A Multirate Signal Processing Approach to Block Decision Feedback Equalizer" Globecom IEEE 90 pp. 1685–1690 vol. 3 of 3, 1990.

Williamson et al. "Block Decision Feedback Equalization" IEEE Transactions vol. 40, No. 2 pp. 255–266, Feb. 1992.

*Primary Examiner*—Temesghen Ghebretinsae
*Attorney, Agent, or Firm*—Killworth, Gottman, Hagan & Schaeff, L.L.P.

[57] ABSTRACT

A block decision feedback equalizer uses a Cholesky algorithm to factor a channel impulse response correlation matrix in order to solve for data received over a dispersive communications channel. While the Cholesky algorithm increases the computational complexity of the initial data symbol estimate (the result of a linear block estimation), its use allows the employment of a recursive update for computing successive data symbols with little additional computation. Further, the Cholesky algorithm is free of limitations that would restrict detection to cases where the channel span or memory is smaller than the probe segment following the data block to be detected. Additional functions such as diversity combining, incorporation of a time-varying channel response model and fractional baud-period sampling are provided in the block detector.

19 Claims, 3 Drawing Sheets

BLOCK DECISION FEEDBACK EQUALIZER

FIELD OF THE INVENTION

The present invention relates to a block decision feedback equalizer and is particularly concerned with adaptive equalization of data transmitted over time varying dispersive channels, the data being transmitted in blocks bordered on both sides by blocks of known symbols.

BACKGROUND OF THE INVENTION

Most modern high-performance equalizers break the equalization problem into two components; determination of an estimate of the channel impulse response and, given the channel impulse response, determination of the data symbols. By separating the problem in this way, modern equalizers avoid the eigenvalue spread problem which slows the convergence of equalizers which attempt to solve the equalization problem directly. This is true of both computed tap DFE's using a traditional DFE feedback structure and block equalizers. in the case of the block equalizer, rather than working on the received signal in a sample-by-sample or symbol-by-symbol basis, blocks of received data are processed. The simplest case is a linear block equalizer, which, like the tapped delay line equalizer, makes an inherent assumption that the transmitted data is continuous valued. In this case, for the block of received signal being detected, an estimate of the channel impulse response is used to derive an estimate of the transmitted signal which, when convolved with the channel impulse response, produces a signal that is most like (in the mean squared error sense) the signal seen by the receiver. With a linear equalizer, one would then simply make detections of the data block based on the estimate of the transmitted signal at this point.

The difficulty of using a block equalizer is to incorporate decision feedback without making things so computationally complex that the whole thing becomes unimplementable. U.S. Pat. No. 4,365,338 issued Dec. 21, 1982 to Harris Corp. uses a very efficient algorithm (Levinson-Durbin) for solving the initial linear block estimation problem, then makes decisions on those symbols at the start and end of the block and then re-sets-up and re-solves the entire problem based on a data block that is now two symbols smaller, with the two end symbols treated as known data. The choice of the Levinson algorithm for solving the linear estimation problem results in an algorithmic limitation: A channel response correlation matrix of Toeplitz form is required, resulting in a corresponding limitation in the kind of signal that can be detected. Thus, the method requires that the symbols following a data block to be detected must be known for an interval equal to the multipath spread of the channel of interest. In most cases this means that sufficient training (or pilot) symbols must follow each data block such that all of the energy from the last data symbol of the block falls within the training block interval. With the Levinson algorithm, the complexity goes from $N^2$ for the linear case to $N^3$ for the decision feedback case, where N is the dimension of the autocorrelation matrix.

The way in which channel response estimates are obtained can vary. The traditional way of doing this is to obtain an initial channel estimate, either through the use of a correlator or a least squares channel estimator and then to use an LMS algorithm to update the channel estimate for the subsequent data blocks using decisions made on previous data and training blocks. Lo is an early example where the channel impulse response was estimated on either side of a block of data and then a channel impulse response appropriate for the center of the data block was obtained through interpolation. In this case, the value is a fixed channel impulse response, albeit a more appropriate channel impulse in that it does not suffer from a lag error. Also, in Lo's case, a traditional computed-tap decision feedback equalizer was employed, rather than the block equalizer discussed here.

All current art as it relates to block equalizers assumes a channel impulse response which is fixed over the length of the block of interest.

In both the "computed-tap" approach and the block equalization schemes, the channel estimate is then updated by using the Least-Mean-Squares (LMS) channel tracking approach, treating detected symbols as known. The detection process can be iterated by using the updated channel estimate to reprocess and to repeat the detection process outlined above.

The use of a method where a computed tap equalizer is driven by channel estimates made on either side of the data block and interpolated to form a single estimate appropriate for the middle of the data block has been published by N.Lo[2][3].

Following the final detection and update of the channel response for a given data block, the same procedure is applied to the next data block using the most recent channel estimate.

The most significant drawback of the current techniques is that the estimate of the channel used in the data detection process inevitably lags behind the true channel. This occurs as a consequence of the fact that the channel estimate employed is either formed from known data received prior to the unknown data to be detected or is derived as a result of the LMS channel tracking procedure. Even in the case where the detection process and channel tracking are iterated several times on a single data-training block, errors made during the initial detection using a channel estimate suffering lag error can compromise the performance of the system. A further limitation inherent in block DFE implementations is considering the channel impulse response to be fixed over the length of the block to be detected. As well, current diversity schemes require substantial increases in computational complexity to incorporate the diversity processing within the equalizer ($\sim N_d^2$, where $N_d$ is the diversity order).

SUMMARY OF THE INVENTION

An object of the present invention is to provide an improved block decision feedback equalizer.

In accordance with an aspect of the present invention there is provided a block decision feedback equalizer comprising an input for a received data signal, the received data signal having a known probe sequence and a block of data symbols, a channel impulse response estimator coupled to the input and having a channel history generator responsive to the known probe sequence, a block detector coupled to the input and the channel impulse response estimator for detecting each data symbol of the block, and a probe data sequence generator coupled to the channel impulse response estimator and the block detector.

In an embodiment of the present invention, the channel impulse response estimator includes a buffer for storing the known probe sequence, the block of unknown data symbols, and a previous probe sequence and both the known and previous probe sequences being adjacent the block of data symbols.

In an embodiment of the present invention, the block detector includes a diversity combiner.

3

In an embodiment of the present invention the block detector includes a diversity combiner and a time varying channel estimator.

In an embodiment of the present invention, the block detector is implemented with a time-varying channel estimator.

In an embodiment of the present invention, the block detector is implemented with fractional baud spaced sampling.

In accordance with another aspect of the present invention there is provided a method of block decision feedback equalizing a received data signal having a known probe sequence and a block of data symbols, comprising the steps of obtaining a channel impulse response estimate which depends upon the known probe sequence, forming a detection block from the received data signal, forming a z vector by filtering the received signal blocks using the estimated channel impulse response, forming a channel autocorrelation matrix R, decomposing matrix R into Cholesky matrix components U and L upper and lower triangular matrices, solving for an intermediate vector x, making an end decision thereby detecting a single data symbol, determining if all symbols have been detected, and if not, decreasing the block size by one and returning to the step of making an end decision and repeating until the whole block has been detected.

In another embodiment of the present invention, the step of obtaining a channel response estimate includes the step of generating a channel history in dependence upon the known probe sequence and a previous probe sequence.

In another embodiment of the present invention, the step of forming the z vector includes the step of applying a linear time-varying impulse response to form the z vector.

In another embodiment of the present invention, the step of forming the R autocorrelation matrix includes the step of applying a linear time-varying impulse response.

The major advantages of this invention are 1) a method of efficiently incorporating a time-varying model of the channel into the detection process either independently or in conjunction with an efficient method for diversity combining.

BRIEF DESCRIPTION OF DRAWINGS

The present invention will be further understood from the following description with references to the drawings in which.

DETAILED DESCRIPTION

Figure 1:
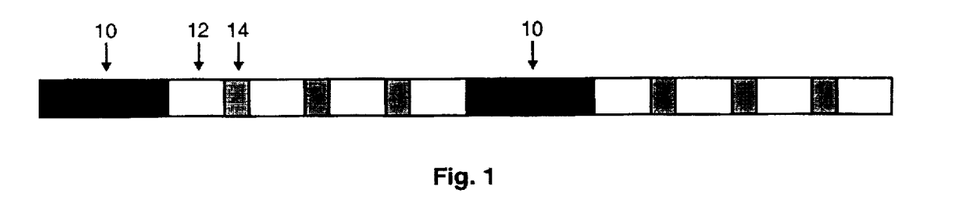
FIG. 1 illustrates a general data format for transmission over a dispersive channel.

In the general data format, as shown in FIG. 1, the transmission of digital data through time-varying dispersive channels, such as the HF channel or the Mobile Cellular channel, often requires the insertion of known data sequences called training or probe segments for good per-

4 formance. The structure of a typical HF serial waveform, STANAG 4285 in this case, is shown in FIG. 1. It consists of a large initial segment of known data, referred to as the preamble 10 or Initial Training, followed by alternating blocks of unknown data 12 and training symbols.

Once synchronization has been achieved based upon the preamble 10, block estimation is performed by using the known training segments 14 on either side of each data block 12, in conjunction with the estimated channel impulse response, to estimate the received signal component due solely to the unknown data. In a decision-feedback-implementation, a decision is made on the initial data symbol, the problem is reformulated to treat that symbol as known, and the solution procedure is repeated. This process continues until decisions have been made on all the unknown data symbols.

Figure 2:
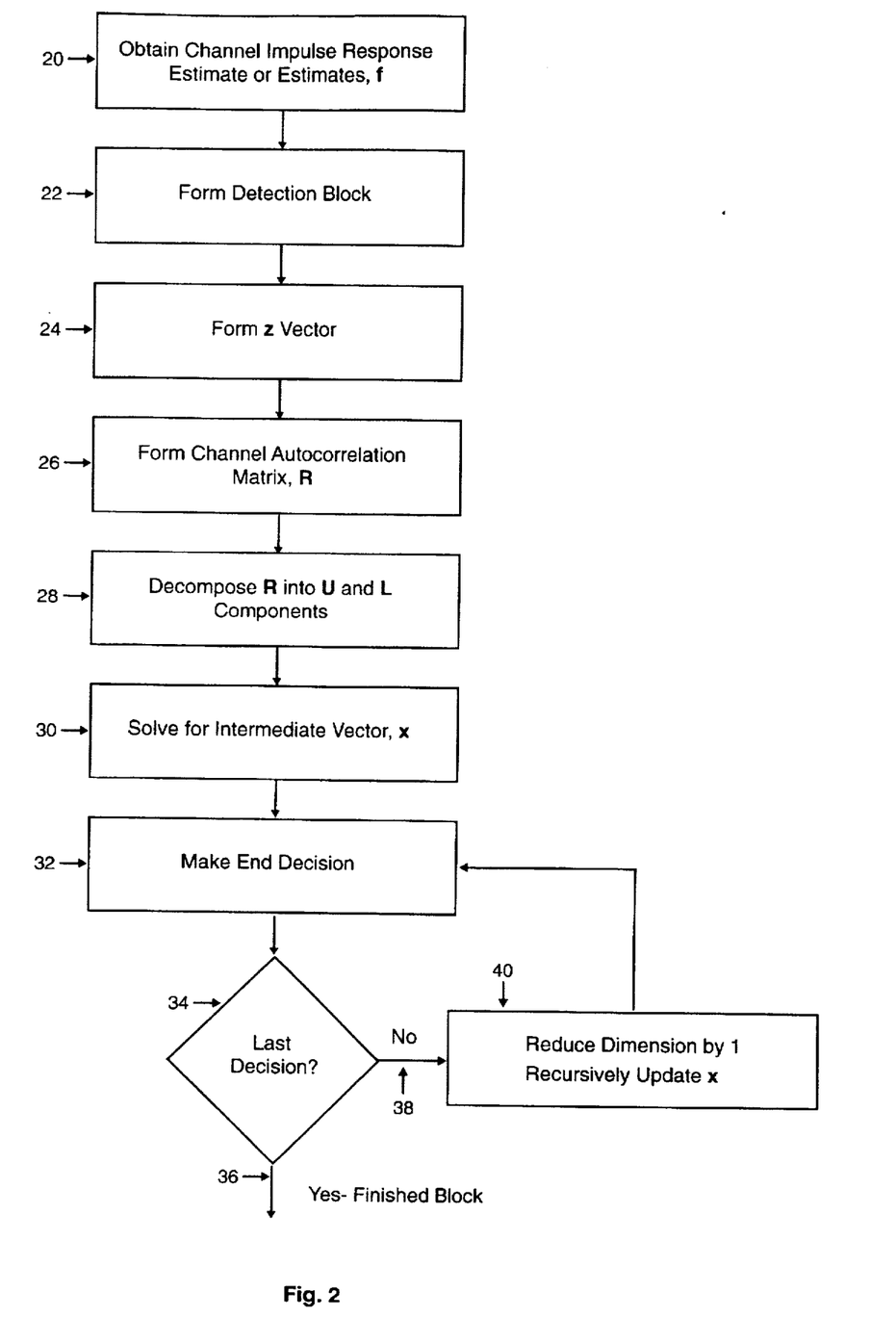
FIG. 2 illustrates in a flow chart a method of block decision feedback equalization in accordance with an embodiment of the present invention.

Referring to FIG. 2 there is illustrated a flowchart outline of the block decision feedback equalization algorithm in accordance with an embodiment of the present invention.

FIG. 2 shows the general solution procedure of the block decision feedback equalizer. The method begins with estimating the channel impulse response as represented by a block 20. Next a detection block is formed as represented by a block 22. Using the channel impulse response and the detection block a z vector and channel autocorrelation matrix R are formed as represented by blocks 24 and 26, respectively. The autocorrelation matrix R is decomposed into upper and lower triangular matrices U and L are represented by a block 28. An intermediate vector x is solved as represented by a block 30. Finally a decision is made detecting an end data symbol as represented by a block 32. It is then determined if the decision is the last decision for the detection block, as represented by a decision block 34, a yes, 36, represents a finished detection block. If no, 38, leads to reducing the detection block dimension by 1 and recursively updating vector X, as represented by a block 40.

A detailed mathematical description of the block decision feedback algorithm follows.

Signal Structure

Figure 3:
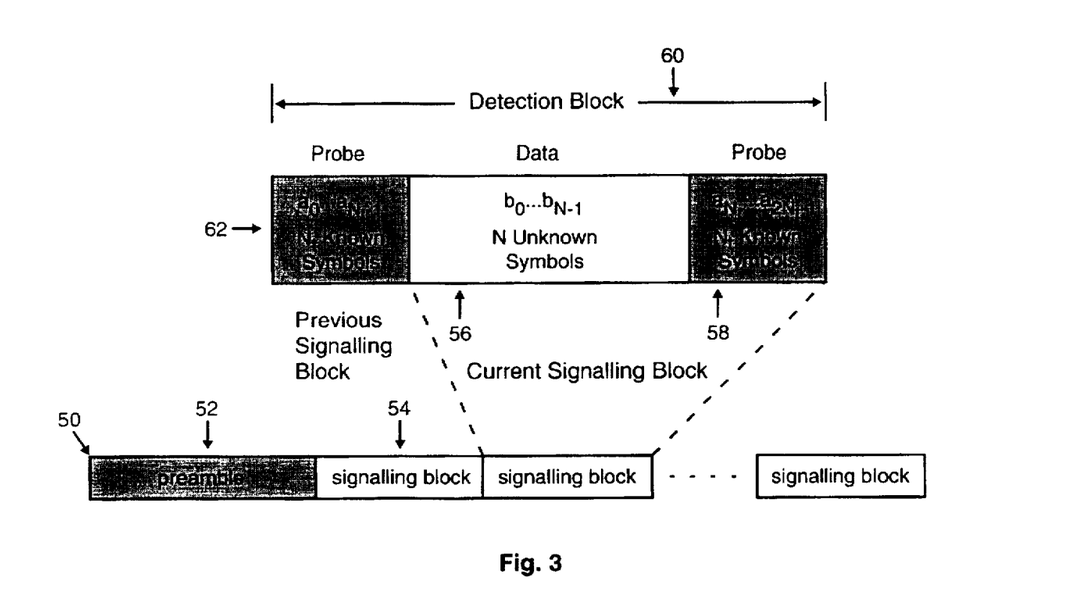
FIG. 3 illustrates, in block diagram form, a detection block in accordance with an embodiment of the present invention.

Referring to FIG. 3, there is illustrated in a block diagram the received signal due to the transmission of a data block and the known training segments immediately preceding and following.

The received data signal 50 includes a preamble 52 and a plurality of signalling blocks 54. A detection block 60 in accordance with an embodiment of the present invention includes a block of unknown data symbols 56 and a block of known symbols, probe 58 of a current signalling block 54 together with a probe 62 of the previous signalling block.

The received signal can then be expressed as $$r(t) = a_1(t) + b(t) + a_2(t) + n(t) \qquad (1)$$

where $$a_1(t) = \sum_{k=-L}^{-1} a_{N_f+k} f(t - kT) \qquad (2)$$

represents the contribution from symbols transmitted prior to the data block of interest, $$b(t) = \sum_{k=0}^{N-1} b_k f(t - kT) \qquad (3)$$

represents the contribution to the received signal from the unknown data symbols, $$a_2(t) = \sum_{k=N}^{N+N_f-1} a_{N_f+k-N} f(t-kT) \quad (4)$$

represents the contribution from symbols transmitted following the data block of interest. f(t) is the channel impulse response, L is the memory of the channel in symbol periods (or alternatively, L is one less than the number of T spaced taps, $N_{ct}$, needed to characterize the channel) and n(t) is an additive noise component.

In the derivation of the block estimation procedure, it is assumed that the channel impulse response, f(t), is known exactly. Estimates of the channel impulse response can be made in a variety of ways. Typically, an initial estimate of the sampled channel impulse response is made from the preamble, using either a correlator based technique or least-squares channel estimation. This initial estimate is then maintained and updated by using decisions made on unknown data to drive an LMS update procedure. With channel interpolation,k estimates of the channel on either side of the data block are used to derive an estimate of the channel appropriate for the center of the data block.

Channel Estimation

The channel interpolation approach requires probe segments large enough for a least squares channel estimate to be performed on either side of a data block. The data detection scheme then uses the value of the channel estimate formed by interpolating to the center of the data block from both sides.

When applying least squares channel estimation to probe segments of the sort shown in FIG. 1, it is mathematically convenient to consider the probe to be composed of a precursor of length L followed by an interval over which the least squares estimate will be made, $N_p'$. That is, in vector form, the probe sequence will be $[a_{-L} \ldots a_0 \ldots a_{(N_p-N_a)}]$ where $N_p$ is the total length of the probe, in symbols.

It can be shown that the least squares estimate of the channel impulse response, $f_{opt}$ is $$\hat{f}_{opt} = A^{*-1} z_c \quad (5)$$

where $A^{*-1}$ is the inverse of the conjugate of the $N_{ct} \times N_{ct}$ probe correlation matrix A, the elements of which are given by, $$a_{i,j} = \sum_{k=0}^{N_p-N_{ct}} a_{k-i} a^*_{k-j}, i, j = 0, \ldots, N_{ct}-1 \quad (6)$$

and $Z_c$ is a vector having the same dimensions as the channel estimate with the $I^{th}$ element given by $$Z_{c_l} = \sum_{k=0}^{N_p-N_{ct}} r_k a^*_{k-l}, l = 0, \ldots, N_{ct}-1 \quad (7)$$

where $r_k$ is the kth element of the observed receive signal vector, $a_k$ is the $k^{th}$ probe symbol, $N_p$ is the total number of probe symbols and $N_{ct}$ is the number of channel taps in the estimate.

An efficient least squares channel estimation can be used with special probe sequences. In this case, a least squares channel estimate can be computed, which normally involves solving some sort of matrix equation, as nothing more than a correlator plus an additive correction factor term, if the transmitted sequence is chosen appropriately. This estimate is used in determining the channel impulse responses which are then fed into the data detection process. This approach is described in further detail below.

The complexity of the channel interpolation approach may be minimized by using appropriate probe sequences. Choosing the probe sequence so that the correlation matrix is of the form $$A^* = MI - eU, \quad (8)$$

where e is some constant, I is the identity matrix and U is a matrix with each element of the matrix equal to unity, allows the computation of the inverse in a computationally efficient manner. The inverse of a matrix which has the form of (25) is simply $$A^{*-1} = \frac{1}{M} \left( I + \frac{eU}{M-Ne} \right). \quad (9)$$

with the solution to the channel impulse response estimation simply given by substituting (7) and (9) into (5). The constant, e, should be as small as possible in order to minimize the detrimental effect of noise from the sidelobes. In the case of certain sequences with zero sidelobes in the autocorrelation matrix, e is in fact 0. For example, a Frank code of length 16 provides a perfect QPSK correlation matrix and a Frank code of length 64 provides a perfect 8-psk probe correlation matrix. M-sequences correlation matrices are nearly perfect, with constant sidelobes of magnitude 1 (ie, e=1 in the equations above). There are other sequences in which e takes the value of one as well. One example of a class of such sequences is the Quadratic Residue (QR) sequences which have been employed in simulation.

The use of (9) in the computation of the channel estimate results in a significant savings in terms of computational complexity over directly solving equation (5) in the straightforward brute force manner. In the discussion which follows, baud rate sampling is assumed. Multiplicative correction factors for increased complexities with T/k sampling will be provided. All Least-Squares methods considered here require the computation of the $z_c$ vector. This requires $(N_p')(N_{ct})$ complex multiplies where $N_p'$ is the interval over which the process is observed ($N_p' = N_p - N_{ct} + 1$). Evaluation of equation (5) using Cholesky decomposition, for $N_{ct}$ large, requires approximately $N_{ct}^3/6$ multiplications in addition to the computation needed to determine the $z_c$ vector, while the use of equation (9) reduces the additional multiplies to $N_{ct}+1$. In the event that the probe sequences must be random or cannot be the special sequences outlined, significant computational savings are still possible if the preamble correlation matrix inverse can be precomputed. In that case, solution of equation (5) requires $N_{ct}^2$ multiplies in addition to the computation of the z vector. Table A below shows the computational complexities involved in computing the channel estimate in various ways. Table A does not include the computation required by the interpolation, which in most cases will simply require an additional $N_{ct}$ multiplications and additions.

LMS channel tracking operates on a symbol by symbol basis, rather than a block basis. The LMS algorithm requires $2N_{ct}+1$ complex multiplies and $2N_{ct}$ complex additions for each symbol. Thus, the total number of operations required for a signalling block is found by multiplying these figures by the number of data symbols, D, and the number of training (probe) symbols, T, in a signalling block. Since D+T is almost certain to be greater than $N_{ct}$ as well as $N_p'$ it is clear that there is no computational complexity penalty for using the channel interpolation approach with efficient least squares channel estimation. In fact, in most cases there should be a slight advantage.

TABLE A

Complexities associated with various channel estimation techniques.

| | $z_c$ vector | Cholesky | Complexity Beyond $z_c$-vector Calculation | | |
|---|---|---|---|---|---|
| | | | Efficient LS | Inverse Precomputed | LMS Tracking |
| MULTS | $N'_p N_{et}$ | $O\left(\frac{N^3_{et}}{6}\right)$ | $N_{et} + 1$ | $N^2_{et}$ | $(2N_{et} + 1)(D + T)$ |
| ADDS | $(N'_p - 1)N_{et}$ | $O\left(\frac{N^3_{et}}{6}\right)$ | $2N_{et} - 1$ | $(N_{et} - 1)^2$ | $2N_{et}(D + T)$ |
| Approximate Complexity Factor for T/k Sampling | k | 1 | k | k | k |

Formation of Detection Block

The initial matrix setup required by a block decision feedback equalizer is the formation of a detection block, ideally containing the signal which would have been received if only the unknown data were sent (i.e. the contribution of the known symbols sent before and after the data block is removed). Thus, with reference to equations (1)–(4), the detection block is formed by using the estimate of the channel impulse response in conjunction with the knowledge of the probe symbols to estimate the signal component due to the probe symbols and subtract that signal component from the received signal $$\hat{c}(t) = r(t) + n(t) - \hat{a}_1(t) - \hat{a}_2(t) \tag{10}$$

where $\hat{a}_1(t)$ is given by $$a_1(t) = \sum_{k=-L}^{-1} a_{N_f + k} \hat{f}_{pre}(t - kT) \tag{11}$$

and $\hat{a}_2(t)$ is given by $$a_2(t) = \sum_{k=N}^{N+N_f-1} a_{N_f + k - N} \hat{f}_{post}(t - kT) \tag{12}$$

where the subscripts pre- and post- for the channel estimate indicate the possibility that the channel estimate used in computing the signal component due to the probe symbols prior to the data block may differ from the channel estimate used to compute the contribution due to the probe symbols following the data block. This would be used, for example, if good estimates of the channel impulse response can be computed from the training symbols immediately prior to, and immediately following, a data block. In the event that an LMS update procedure were used, the best current channel estimate would be used as both the pre- and the post-data block channel estimate.

Estimate of Data Symbols

The sum of squared errors (sse) associated with a particular estimation of the transmitted data symbols can be expressed as $$sse(\hat{b}) = \int_0^{T_{obs}} |c(t) - \hat{b}(t)|^2 dt \tag{13}$$

where $\hat{b}$ is the vector of unquantized decisions, $$\hat{b}(t) = \sum_{k=0}^{N-1} \hat{b}_k f(t - kT) \tag{14}$$

and $$c(t) = b(t) + n(t) \tag{15}$$

is the received signal contribution due to the transmitted unknown data symbols and additive noise. (As the channel impulse response is assumed to be perfectly known, the contributions from known data prior to and following the block is assumed to be completely removed by estimating $a_1(t)$ and $a_2(t)$ and then subtracting these components out of the received signal.)

Expansion of equation (13) using equation (14) results in $$sse(\hat{b}) = E_c - 2\Re(z'\hat{b}^*) + \hat{b}'R\hat{b}^* \tag{16}$$

where $E_c$ is the observed energy of the received signal, $\Re$ indicates the operation of taking the real part, z is an N dimensional column vector containing the N output samples from a filter matched to the channel (or partially matched if the observation intervals is not sufficient to capture all of the signal energy) where the kth element of z is given by $$z'_k = \int_0^{T_{obs}} c(t) f^*(t - kT) dt, \, k = 0, 1, \ldots N - 1 \tag{17}$$

and R is an N by N autocorrelation matrix with k,l-th element given by $$r_{k,l} = \int_0^{T_{obs}} f(t - kT) f^*(t - lT) dt, \, k, l = 0, 1, \ldots, N - 1 \tag{18}$$

Straightforward manipulation of equation (16) leads to the optimum linear (unquantized) solution to the problem:

$$\hat{b} = R^{-1} z \tag{19}$$

An alternative formulation of this problem in matrix notation is:

$$Fb + n = r \tag{20}$$

where $$F = \begin{bmatrix} f_0 & 0 & 0 & & 0 & 0 \\ f_1 & f_0 & 0 & & 0 & 0 \\ f_2 & f_1 & f_0 & \cdots & 0 & 0 \\ f_3 & f_2 & f_1 & & 0 & 0 \\ & & \cdots & & & \cdots \\ f_L & f_{L-1} & f_{L-2} & & 0 & 0 \\ 0 & f_L & f_{L-1} & \cdots & 0 & 0 \\ 0 & 0 & f_L & & f_0 & 0 \\ & & \cdots & & & \cdots \\ 0 & 0 & 0 & & f_{L-1} & f_{L-2} \\ 0 & 0 & 0 & \cdots & f_L & f_{L-1} \\ 0 & 0 & 0 & & 0 & f_L \end{bmatrix}$$

$$b = \begin{bmatrix} b_0 \\ b_1 \\ b_2 \\ \cdots \\ b_{N-1} \end{bmatrix}, r = \begin{bmatrix} r_0 \\ r_1 \\ r_2 \\ r_3 \\ \cdots \\ r_{N+L-1} \\ r_{N+L} \end{bmatrix}$$

The Least-Squares formulation of the data estimation problem is then $$F^*F\hat{b}=F^*r \quad (21)$$

or, more simply, $$R^*\hat{b}=z \quad (22)$$

where $$R=F^*F^*, \text{ is a "channel correlation matrix"}, z=F^*r \quad (23)$$

and thus the best estimate of the data vector is $$\hat{b}=R^{*-1}z_f \quad (24)$$

which is the same result as equation (19).

A number of techniques are available for solving this set of equations without explicitly computing the inverse. R is, by definition, Hermitian. It may also be Toeplitz, if the observation interval is long enough to capture all of the energy from the unknown symbols. In other words, the matrix will be Toeplitz if the duration of the probe segment following the block of unknown data is longer than the channel memory. The well-known Levinson-Durbin recursion for solving this matrix equation is applicable in the Toeplitz case.

An embodiment of the present invention uses a less efficient method for solving the linear problem (Cholesky, $N^3$) which can incorporate decision feedback at no additional computational cost. For non-Toeplitz R, the Cholesky factorization is appropriate, but in the linear estimation problem, the Cholesky solution is roughly a factor of N more computationally complex. Decisions are made one at a time, with a consequent gain in performance over an algorithm which makes decisions two at a time to keep complexity manageable. Another advantage of the Cholesky approach is that there is no algorithmic limitation on the duration of the channel multipath delay spread which can be tolerated. Also, the decision feedback process is done in a manner which takes advantage of the fact that the autocorrelation matrix will not be completely filled if the number of data symbols to be detected is greater than the channel impulse response length.

The above discussion has all centered on the solution of equation (25). How the problem is set up changes what is being done, regardless of the method used to solve (25). The way in which the channel impulse response estimate, used in the solution of equation (25), is obtained can vary.

In a decision feedback equalizer, it is necessary that equation (24) be solved first to provide a linear solution for the initial decision or decisions. Once that decision (or decisions) has been made, equation (24) must be re-solved for the new, smaller, data vector with the decision or decisions treated as known data. Although the Levison-Durbin recursion is very efficient for solving equation (24), it does not lend itself particularly well to a recursive update for re-solving equation (24) once decisions have been made. Consequently, the complexity of the algorithm goes from order $N^2$, for the linear case, to order $N^3$ for the decision feedback case. On the other hand, the non-Toeplitz solution, using the Cholesky factorization, is better suited to order updating and the complexity of the decision-feedback algorithm is exactly the same as the complexity of the linear algorithm. A detailed description for the Cholesky based algorithm follows.

Given that R displays Hermitian symmetry (and may in some restrictive cases be Toeplitz), $$R^*\hat{b}=z \quad (25)$$

can be rewritten as $$LU\hat{b}=z \quad (26)$$

where L and U are lower and upper triangular matrices determined from a Cholesky factorization of $R^*$. The standard Cholesky factorization involves separating a Hermitian symmetric matrix into the product of an upper and a lower triangular matrix with Hermitian symmetry. This factorization requires square roots in the computation of the diagonal elements to maintain Hermitian symmetry, but a modified Cholesky factorization which results in ones down the diagonal of either the upper or the lower matrix, which requires no square root operations, can be employed. A formulation of the modified Cholesky with 1's along the diagonal of the lower triangular matrix is given by for $i = 0, 1, \ldots, N-1$ $$u_{i,j} = r_{i,j} - \sum_{k=0}^{i-1} l_{i,k} u_{k,j} \qquad (27)$$

for $j = i+1, \ldots, N-1$ $$u_{i,j} = r_{i,j} - \sum_{k=0}^{i-1} l_{i,k} u_{k,j} \qquad (28)$$

$$l_{j,i} = \frac{u^*_{i,j}}{u_{i,i}} \qquad (29)$$

The initial, linear solution to equation (26) can then be obtained by solving the two triangular systems:

$$U\hat{b} = x \qquad (30)$$

and $$Lx = z \qquad (31)$$

The solution of equation (31) for x is given by for $i=0, \ldots N-1$ for $i = 0, \ldots, N-1$ $$x_i = z_i - \sum_{k=0}^{i-1} l_{i,k} x_k \qquad (32)$$

For the continuously variable data case, corresponding to the linear estimator, the solution for $\hat{b}$ is completed by substituting into equation (30) and solving the triangular set of equations. For the decision feedback case, it can be shown that the original x vector can be updated to include the result of previous decisions as follows:

$$x_{(N-1)} = x_{(N)} - \tilde{b}_{N-1} u_{(N)} \qquad (33)$$

where $\tilde{b}_{N-1}$ is the previous edge decision, the bracketed subscripts indicate the size of the data block and the raised dots indicate that the end element of the vector has been removed. Under the assumption that correct decisions are made, equation (33) can be used to update the x vector following decisions. Given the initial x vector found using equation (31), the decisions for the block can be generated from $$\hat{b}_i = \frac{1}{u_{i,i}} \left( x_i - \sum_{k=i+1}^{N-1} u_{i,k} \tilde{b}_k \right) i = N-1, \ldots, 0 \qquad (34)$$

where $\tilde{b}_i$=decision ($\hat{b}_i$) and decisions are made from the end of the block. In most cases it is desirable to make decisions from the beginning of the block and this can be accomplished through the use of a simple reversal mapping of the R, b and z vectors.

In the above, it was assumed that the channel was fixed over the block of signal. In practice this is not true as the channel varies with time. If a channel interpolation approach is taken, where estimates of the channel impulse response preceding and following the data block to be detected are available, a sensible and reasonable estimate of the way in which the channel varies over the block can be made. For example it is possible to incorporate a time-varying channel impulse response into the model so that the R and z in equation (25) are actually based on a channel estimate that is varying with time throughout the block. This is shown in equations (38) and (39). Further, it can be done efficiently, as shown in equations (41)–(44). Note that, although the time-varying model does not depend explicitly upon a channel interpolation approach, in practice it does because of the necessity of accessing channel impulse response estimates on either side of the data in order to incorporate a time-varying model into the detection process. This applies to the setup of equation (25), implies that any block equalizer can take advantage of this form of processing; it is not limited to the Cholesky based implementation described above.

A simple way to incorporate a time varying channel is to assume that the channel changes linearly over the block. More elaborate schemes are possible. For example if additional channel estimates are available on both sides of the data block of interest, that is two previous and two post estimates a quadratic based time varying scheme could be applied.

That is, for the linear case:

$$f(t-kT) = f_o(t-kT) + k\Delta(t-kT) \qquad (35)$$

where $f_o(t-kT)$ is the sampled channel impulse response at the beginning of the block also $f_o(t-kT)$ is fixed and $\Delta(t-kT)$ is the incremental change in the channel impulse response from sample to sample and is given by $$\Delta(t-kT) = \frac{f_{post}(t-kT) - f_{pre}(t-kT)}{(N+N_t)} \qquad (36)$$

where the subscript pre- and post- are used to indicate the channel estimates made using the training sequences prior to and following the data block respectively and are fixed and do not vary with time or instances. $f_{pre}(t-kT)$ points to the middle of the training block before the data block $f_{post}(t-kT)$ points to the middle of the training block after the data block. The sampled representation for fractional symbol spaced sampling with period T/K is given by $$\Delta_{iK+j} = \frac{f_{post}(iK+j) - f_{pre}(iK+j)}{(N+N_t)K} \quad i=0,\ldots,N_{ch}, j=0,\ldots,K-1 \qquad (37)$$

This is one of two possible definitions for a time varying impulse response. In this case, the convention is that all lags of the impulse response are specified at a given time. Thus, if the impulse response were specified at time zero, the response to an impulse at time zero would map out the prescribed impulse response. The alternative would be to specify the impulse response in terms of its response in absolute time. In this case, the response to an impulse at time zero would depend on the impulse response specification over the entire length of the impulse. For the discrete case, the response at time zero would depend on the zeroth element of the impulse response appropriate for time zero while the response at time 1 would depend on the first lag of the impulse response appropriate for time 1 and so on.

This linearly time-varying channel impulse response can be incorporated in the BDFE model. The initial detection block formation can either be made using the formulation given in equation (10) or the time-varying aspect can be extended to the detection block setup by noting that the appropriate channel estimate for use in computing the effects of the known probe sequences is now given by equation (35). Thus, for the time-varying implementation, the channel estimate used in equations equation (11) and equation (12) is that given by equation (35).

The autocorrelation matrix, R, and the z vector must be computed using the time varying impulse response of (35):

$$r_{k,l} = \int_0^{T_{obs}} (f_0(t-kT) + k\Delta(t-kT)) \; (f_0^*(t-lT) + \quad (38)$$

$$l\Delta^*(t-lT))dt, k,l = 0,1,\ldots,N-1$$

and $$z_k = \int_0^{T_{obs}} c(t) \; (f_0^*(t-kT) + k\Delta^*(t-kT))dt, k = 0,1,\ldots N-1 \quad (39)$$

The sampled time-varying z vector can be computed as $$Z_k = \sum_{i=0}^{LIM_1} c_{k+i}(f_i^* + k\Delta_i^*), k = 0, 1, \ldots, N-1,$$

where the $_0$ has been removed from the fixed channel impulse response for rotational convenience and
where $LIM_z = N_t$ if $N_t < N+N_t-k$ or $N+N_t$ if some of the energy spills beyond the trailing training block and where c(0) refers to the beginning of the data block. Fractional spacing can be achieved by interleaving the fractional spaced impulse responses appropriately.

The sampled channel impulse response, using K samples per symbol and with the subscript 0 removed from the fixed channel impulse term for convenience, can be used in the calculation of the lower triangular elements of R, with the upper elements obtained using Hermitian symmetry, as follows $$r_{k,l} = \quad (40)$$

$$\sum_{i=k}^{L/M} \sum_{j=0}^{K} (f_{(i-k)K+j} + (kK)\Delta_{(i-k)K+j}) \; (f^*_{(i-l)K+j} + (lK)\Delta^*_{(i-l)K+j}), k \geq l$$

where the summation on i goes to the value LIM which is either $I+N_t$ if $k+l<N+N_t$ and all the signal energy from the data symbols has been captured, or $N+N_t$ if some of the signal energy from the data block spills beyond the boundary of the trailing training segment.

Note that because of the definition used from the time varying impulse response function, the multiplicative factor on the $\Delta$ term is a function only of the delay, and not of the absolute time. Clearly, brute force computation of R could be undesirably computed if every element of the matrix were computed independently. A matrix decomposition can be used to simplify the initial computation by using the fact that R is a correlation type matrix as are the component matrices:

$$R = R_{f0} + R_{f0\Delta} + R_{\Delta f0} + R_\Delta \quad (41)$$

where $R_{f0}$ is the autocorrelation matrix formed by considering a fixed impulse response appropriate for the first element of the block, $R_{f0\Delta}$ and $R_{\Delta f0}$ represent the cross terms and $R_\Delta$ represents solely due to the time varying term. Writing equation (40) in terms of the component matrices of (41), the elements of the matrix are given by $$r_{k,l} = \sum_{i=k}^{L/M} \sum_{j=0}^{K} (f_{(i-k)K+j}) \; (f^*_{(i-l)K+j}) + \quad (42)$$

$$\sum_{i=k}^{L/M} \sum_{j=0}^{K} (f_{(i-k)K+j}) \; ((lK)\Delta^*_{(i-l)K+j}) +$$

-continued $$\sum_{i=k}^{L/M} \sum_{j=0}^{K} ((kK)\Delta_{(i-k)K+j}) \; (f^*_{(i-l)K+j}) +$$

$$\sum_{i=k}^{L/M} \sum_{j=0}^{K} ((kK)\Delta_{(i-k)K+j}) \; ((lK)\Delta^*_{(i-l)K+j})$$

Each of the component matrices can be computed efficiently, with a complexity of order $N^2$, where N is the dimension of the matrix, by employing a backward recursion. For illustrative purposes, and to avoid unnecessary complications in the explanation, consider the elements of the original, fixed, autocorrelation matrix of equation (18). Initially the elements of the bottom row of R are computed. If the matrix is Toeplitz, all other elements are now known from symmetry considerations. If the matrix is only Hermitian symmetric, and not necessarily Toeplitz, a backward recursion can be used to generate all of the other terms with the complexity never exceeding that for the Toeplitz matrix. The recursion is given by $$r_{k-1,l-1} = r_{k,l} + K_{k,l} \quad (43)$$

where $I_{k,l}$ represents the additional contribution (if any) from a single symbol period:

$$I_{k,l} = \sum_{i=k}^{k+1} \sum_{j=0}^{K} (f_{(i-k)K+j}) \; (f^*_{(i-l)K+j}) \quad (44)$$

and $I_{k,l}$ will be identically zero if $K+l>I+N_{cr}$.

Because of the Hermitian symmetry between the two cross term matrices, matrix set-up times increase by a factor of about 4 relative to the fixed impulse response case and, consequently, because the overall complexity of the algorithm is dominated by the Cholesky factorization, a linear increase in the matrix set-up times is not overwhelming.

Diversity Combining

Diversity combining is the use of signals from more than one antenna in the solution procedure. The diversity considered may be space, frequency, polarization or other, but an underlying assumption is made that similar noise levels are seen by each antenna. Gain scaling will be required for situations where this is not the case.

Going back to the setup of equation (25); it is possible to incorporate signals from a number of sources in a very simple and elegant way to achieve an efficient diversity combining. This can be done in conjunction with a time-varying model or independent of it and is applicable to any block equalizer. Diversity combining is shown in equations (45)–(48).

The formulation would be given by equation (45) where F and r elements are unchanged from the nondiversity quantities and G and s elements represent samples from a second antenna. It is useful to have this equation written out in full as in equation (45) as it makes it easy to see that the dimension of the autocorrelation matrix, and hence the complexity of the solution procedure, is unchanged from the previous case. While it is not necessary to separate the matrices they are shown that way here for clarity of presentation. In practice they are more likely to be interleaved for ease of implementation.

$$\begin{bmatrix} f_0 & 0 & 0 & 0 & 0 \\ f_1 & f_0 & 0 & 0 & 0 \\ f_2 & f_1 & f_0 \cdots & 0 & 0 \\ & & \cdots & & \\ f_L & f_{L-1} & f_{L-2} & 0 & 0 \\ 0 & f_L & f_{L-1} \cdots & 0 & 0 \\ 0 & 0 & f_L & f_0 & 0 \\ 0 & 0 & 0 \cdots & f_L & f_{L-1} \\ 0 & 0 & 0 & 0 & f_L \\ g_0 & 0 & 0 & 0 & 0 \\ g_1 & g_0 & 0 & 0 & 0 \\ g_2 & g_1 & g_0 \cdots & 0 & 0 \\ & & \cdots & & \\ g_L & g_{L-1} & g_{L-2} & 0 & 0 \\ 0 & g_L & g_{L-1} \cdots & 0 & 0 \\ 0 & 0 & g_L & g_0 & 0 \\ 0 & 0 & 0 \cdots & g_L & g_{L-1} \\ 0 & 0 & 0 & 0 & g_L \end{bmatrix} \begin{bmatrix} b_0 \\ b_1 \\ b_2 \\ \cdots \\ b_{N-1} \end{bmatrix} = \begin{bmatrix} r_0 \\ r_1 \\ r_2 \\ r_3 \\ \cdots \\ r_{N+L-1} \\ r_{N+L} \\ s_0 \\ s_1 \\ s_2 \\ s_3 \\ \cdots \\ s_{N+L-1} \\ s_{N+L} \end{bmatrix} \quad (45)$$

This may require prescaling of the received signals in some cases. Gain scaling will be required for situations where this is not the case, as noted above. The diversity estimation problem for two antennas can be formulated as $$\begin{bmatrix} F \\ G \end{bmatrix}[b] = \begin{bmatrix} r \\ s \end{bmatrix} \quad (46)$$

where F and G are the channel impulse response matrices for signals received from antenna 0 and antenna 1 respectively. Thus, clearly $$R^*_D \hat{b} = z_D \quad (47)$$

where $$R_D = \begin{bmatrix} F \\ G \end{bmatrix}' \begin{bmatrix} F \\ G \end{bmatrix}^*, z_D = \begin{bmatrix} F \\ G \end{bmatrix}^{*T} \begin{bmatrix} r_0 \\ r_1 \end{bmatrix}. \quad (48)$$

Again, clearly the problem solution proceeds in the same manner as for baud rate sampling with a single input. This is easily extended to more than two antennas by adding additional submatrices and while submatrices have been used for clarity of presentation, implementations could alternatively interleave the samples from each antenna into a single data stream. Note that this only increases the complexity of the set-up procedure; the solution procedure is unchanged.

Incorporation of Fractional Spaced Sampling

To alleviate the necessity for having exact synchronization, it is usually desirable to sample the signal at a rate greater than the baud rate. Equalizers employing sampling of this sort are said to be fractionally spaced. Fractionally spaced equalization is easily accommodated within the BDFE structure by noting that equation (20) can be reformulated to accommodate fractional spacing without changing the basic solution procedure. For example, for a T/2 spaced equalizer, the formulation would be in a compact notation, equation (20) can be written as $$\begin{bmatrix} F \\ F' \end{bmatrix}[b] + = \begin{bmatrix} r \\ r' \end{bmatrix} \quad (49)$$

where F and F' are the channel impulse response matrices, and r and r' are the received signal vectors, all of which are sampled at the symbol rate (1/T), with an offset of T/2 between the regular and "prime" quantities. Extension of this approach to T/K sampling where K is greater than 2 simply requires an additional submatrix for each additional sample per baud.

The problem formulation then continues in the same fashion as before with $$R^*_{T/2} \hat{b} = z_{T/2} \quad (50)$$

where $$R_{T/2} = \begin{bmatrix} F \\ F' \end{bmatrix}' \begin{bmatrix} F \\ F' \end{bmatrix}^*, z = \begin{bmatrix} F \\ F_1 \end{bmatrix}^{*T} \begin{bmatrix} r \\ r' \end{bmatrix} \quad (51)$$

and the remainder of the solution is the same as for baud rate sampling.

Further, the combination of diversity with fractional spacing simply requires additional submatrices or interleaving.

Figure 4A:
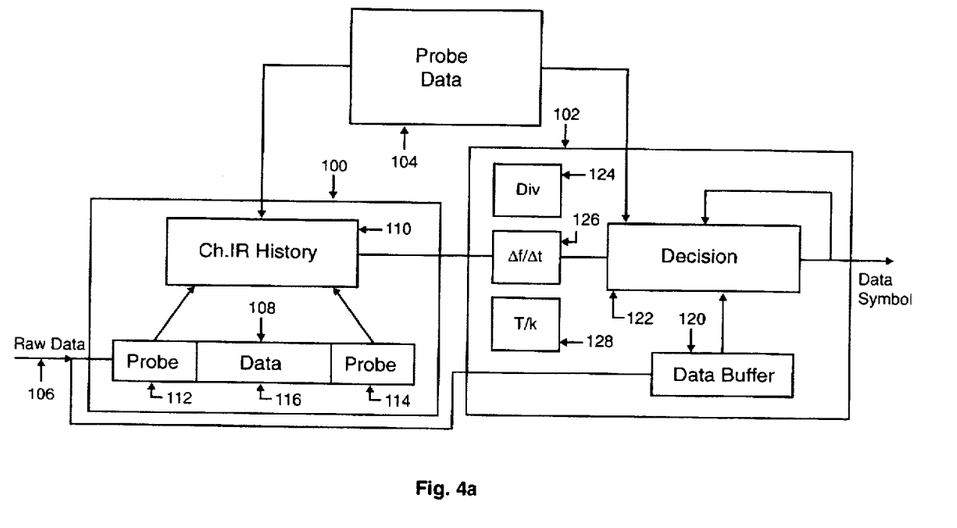
FIGS. 4a and 4b illustrate in a functional block design, a block diagram feedback equalizer in accordance with an embodiment of the present invention.
Figure 4B:
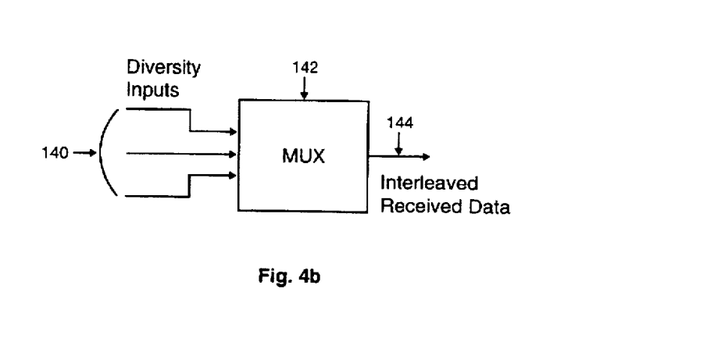

Referring to FIGS. 4a and 4b, there is illustrated in a functional block diagram, a block decision feedback equalizer in accordance with an embodiment of the present invention. The equalizer includes an estimator 100, a block detector 102 and a probe data source 104. The probe data source 104 can be any device suitable to the type of probe data used in the data frame. For example, some protocols use pseudo random generators at the transmitter and receiver. Fixed probe sequence could be provided by ROM. The estimator 100 has an input 106 for received data, a buffer 108 for receiving the detector block and a channel history generator 110 responsive to probes 112 and 114 adjacent the received data block 116. The output of estimator 100 is applied as input to the block detector 102 along with the received data from the input 106. The block detector 102 includes a data buffer 120, a decision function 122 and diversity combining, time-varying channel response and fractional spaced sampling functions 124, 126 and 128, respectively. Probe data is applied from the probe data source 104 to the channel history generator 110 and the decision function 122. The diversity combining, time varying channel response, and fraction spaced sampling functions effect the autocorrelation matrix R as described hereinabove. Each function is optional. When diversity combining is used, the received data input 106 takes the form shown in FIG. 4b. Plural inputs 140 are combined via a multiplexor 142 to provide a single input 144 having interleaved diversity data. The block decision feedback equalizer in accordance with an embodiment of the present invention has been implemented in a digital signal processor for example a TMS 320C40 by Texas Instruments.

References

[1] McRae et. al., Technique for High Rate Digital Transmission Over a Dynamic Dispersive Channel, U.S. Pat. No. 4,365,338, Dec. 21, 1982.

[2] N.Lo, "Adaptive equalization and diversity combining for a mobile radio channel", Ph.D. Thesis, Carleton University, Ottawa, Canada, May 1990.

[3] N. Lo, "Adaptive equalization and diversity combining for a mobile radio channel", *Carleton University Systems and Computer Engineering Technical Report*, Ottawa, Canada, May 1990.

Numerous modifications, variations, and adaptations may be made to the particular embodiments of the invention described above without departing from the scope of the invention, which is defined in the claims.

What is claimed is:

1. A block decision feedback equalizer comprising:

an input for a received data signal, the received data signal having a known probe sequence and a block of data symbols;

a channel impulse response estimator coupled to the input and having a channel history generator responsive to the known probe sequence;

a block detector coupled to the input and the channel impulse estimator for detecting each data symbol of the block; and a probe data sequence generator coupled to the channel impulse response estimator and the block detector.

2. An equalizer as claimed in claim 1, wherein the channel impulse response estimator includes a buffer for storing the known probe sequence, the block of data symbols, and a previous probe sequence, both the known and previous probe sequences being adjacent the block of data symbols.

3. An equalizer as claimed in claim 2 wherein the channel history generator is responsive to both current and previous probe sequences.

4. An equalizer as claimed in claim 1 wherein the block detector includes a diversity combiner.

5. An equalizer as claimed in claim 4 wherein the diversity combiner includes means for receiving data signals from a plurality of diversity channels.

6. An equalizer as claimed in claim 5 wherein the plurality is two.

7. An equalizer as claimed in claim 6 wherein the diversity combiner includes means for solving a diversity estimation problem is given by $$\begin{bmatrix} F \\ G \end{bmatrix} [b] = \begin{bmatrix} r \\ s \end{bmatrix}$$

where F and G are channel impulse response matrices for signals received from first and second antennas, b is a vector representing the block of data symbols, and r, s are a concatenated received signal vector for the first and second channels.

8. An equalizer as claimed in claim 3 wherein the block detector includes a time-varying channel impulse response estimator.

9. An equalizer as claimed in claim 8 wherein the time-varying channel impulse response estimator generates a time varying impulse response for the channel in dependence upon the channel history generator output responsive to both the known and previous probe sequences.

10. An equalizer as claimed in claim 3 wherein the block detector includes a fractionally spaced sampler.

11. An equalizer as claimed in claim 10 wherein the fractionally spaced sampler generates channel impulse response submatrices for each integral fraction of baud rate.

12. An equalizer as claimed in claim 11 wherein the fractionally spaced sampler operates at a rate of T/2, where T is the baud rate, thereby solving the equation $$\begin{bmatrix} F \\ F' \end{bmatrix} [b] = \begin{bmatrix} r \\ r' \end{bmatrix}$$

where F and F' are the channel impulse response matrices for T (baud rate) spaced samples, with the samples comprising F' offset by T/2 from those of F; r and r' are the T spaced samples of the received signal, with the samples of r' offset by T/2 from those of r; b is a vector representing the block of data symbols, and the remainder of the solution is the same as for baud rate sampling.

13. A method of block decision feedback equalizing a received data signal having a known probe sequence and a block of data symbols, comprising the steps of:

obtaining a channel impulse response estimate in dependence upon the known probe sequence;

forming a detection block from the received data signal;

forming a z vector by filtering the received data signal using an estimate of the channel impulse response;

forming an autocorrelation matrix R;

decomposing matrix R into matrix components U and L;

solving for an intermediate vector x;

making an end decision thereby detecting one data symbol;

determining if all symbols had been detected; and if not, decreasing the block size by one and returning to the step of making an end decision and repeating until the whole block has been detected.

14. A method as claimed in claim 13 wherein the step of obtaining a channel impulse response estimate includes the step of generating a channel history in dependence upon the known probe sequence and a previous probe sequence.

15. A method as claimed in claim 14 wherein the step of obtaining a time-varying channel impulse response estimate includes the step of deriving a time-varying impulse response from the channel history and using it in place of the channel impulse response estimate.

16. A method as claimed in claim 15 wherein the step of forming the z vector includes the step of applying a time-varying channel impulse response to form the z vector.

17. A method as claimed in claim 15 wherein the step of forming the R channel autocorrelation matrix includes the step of applying a time-varying channel impulse response.

18. A method as claimed in claim 17 wherein the channel autocorrelation matrix R has the form $$R = R_{\gamma 0} + R_{\gamma 0 \Delta} + R_{\Delta \gamma 0} + R_{\Delta \Delta}$$

where $R_{\gamma 0}$ is the autocorrelation matrix formed by considering a fixed impulse response appropriate for the first element of the block, $R_{\gamma 0 \Delta}$ and $R_{\Delta \gamma 0}$ represent the cross terms and $R_\Delta$ represents the component due solely to the time varying term.

19. A method as claimed in claim 16 wherein the elements of the z vector are determined as $$z_k = \sum_{i=0}^{LIM_z} c_{k+i}(f_i^* + k\Delta_i^*), k = 0, 1, \ldots, N-1$$

where the $c_i$ is the ith element of the detection block formed from the received data signal, $f_i$ is the ith element of the fixed channel impulse response estimate, $\Delta_i$ represents the incremental change in the ith element of the channel impulse response estimate for each time interval, * represents the complex conjugate operator, the summation of i goes to the value $LIM_z$ which is either sufficient to capture all of the energy from the data symbols or indicates the last of the known symbols following the data block to be detected.

* * * * *

UNITED STATES PATENT AND TRADEMARK OFFICE
CERTIFICATE OF CORRECTION

PATENT NO : 5,790,598

DATED : August 4, 1998

INVENTOR(S) : Moreland et al.

It is certified that error appears in the above-identified patent and that said Letters Patent is hereby corrected as shown below:

Col. 18, line 42, "$R = R_{fo} + R_{fo\Delta} + R_{\Delta fo} + R_{66\Delta}$" should be
--$R = R_{fo} + R_{fo\Delta} + R_{\Delta fo} + R_{\Delta}$.--.

Signed and Sealed this

Ninth Day of February, 1999

Attest:

*Attesting Officer*

*Acting Commissioner of Patents and Trademarks*